US010945276B2

(12) United States Patent
Liu et al.

(10) Patent No.: US 10,945,276 B2
(45) Date of Patent: Mar. 9, 2021

(54) METHODS, BASE STATION AND USER EQUIPMENT

(71) Applicant: Telefonaktiebolaget LM Ericsson (publ), Stockholm (SE)

(72) Inventors: Jinhua Liu, Beijing (CN); Robert Baldemair, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 137 days.

(21) Appl. No.: 15/505,596

(22) PCT Filed: Feb. 6, 2017

(86) PCT No.: PCT/CN2017/072953
§ 371 (c)(1),
(2) Date: Feb. 21, 2017

(87) PCT Pub. No.: WO2017/059829
PCT Pub. Date: Apr. 13, 2017

(65) Prior Publication Data
US 2018/0220438 A1 Aug. 2, 2018

(30) Foreign Application Priority Data

Nov. 4, 2016 (WO) ................ PCT/CN2016/104646

(51) Int. Cl.
*H04W 72/04* (2009.01)
*H04W 72/12* (2009.01)
*H04W 48/12* (2009.01)

(52) U.S. Cl.
CPC ....... *H04W 72/1236* (2013.01); *H04W 48/12* (2013.01); *H04W 72/042* (2013.01); *H04W 72/1215* (2013.01); *H04W 72/1289* (2013.01)

(58) Field of Classification Search
None
See application file for complete search history.

(56) References Cited

U.S. PATENT DOCUMENTS 7,853,262 B2    12/2010  Cheon et al.
2017/0325164 A1*  11/2017  Lee ..................... H04W 72/042
(Continued)

FOREIGN PATENT DOCUMENTS

EP         1816807 A1     8/2007
IN    3837/KOLNP/2010 A   11/2011
WO      2011/116365 A2    9/2011

OTHER PUBLICATIONS

ZTE et al, "URLLC and eMBB frame structure and multiplexing", Oct. 10-14, 2016, 3GPP TSG-RAN WG1 Meeting #86bis, Lisbon, Portugal, R1-1608957, 7 pages (Year: 2016).*

(Continued)

*Primary Examiner* — Ayaz R Sheikh
*Assistant Examiner* — Sori A Aga
(74) *Attorney, Agent, or Firm* — NDWE LLP

(57) ABSTRACT

A base station maps a first Transmission Time Interval (TTI) configuration associated with a carrier of a RAN to a first RAN slice. The first RAN slice is configured to support a first Quality of Service (QoS) requirement. The first TTI configuration comprises a first number of Orthogonal Frequency-Division Multiplexing (OFDM) symbols. The base station maps a second TTI configuration associated with the carrier to a second RAN slice. The second RAN slice is configured to support a second QoS requirement different from the first QoS requirement. The second TTI configuration comprises a second number of the OFDM symbols and is different from the first TTI configuration. The OFDM symbols with respect to the first and the second RAN slices are defined according to a single numerology. The base station informs a UE of the first and second TTI configurations mapped respectively to the first and second RAN slices.

14 Claims, 9 Drawing Sheets

(56) References Cited

U.S. PATENT DOCUMENTS

2018/0103428 A1* 4/2018 Jiang ............... H04W 76/27
2018/0242317 A1* 8/2018 Marinier ............ H04W 56/003

OTHER PUBLICATIONS

Extended European Search Report for Application No. 17704155.5, dated Jun. 22, 2018, 10 pages.

Huawei., et al., "Overview of 5G frame structure," Apr. 11-15, 2016, 3GPP TSG RAN WG1 Meeting #84bis, Busan, Korea, R1-162157, 6 pages.

Intel Corporation, "Frame Structure Considerations for URLLC," Aug. 22-26, 2016, 3GPP TSG RAN WG1 Meeting #86 Gothenburg, Sweden, R1-167127, 10 pages.

Zte., et al., "URLLC and eMBB frame structure and multiplexing," Oct. 10-14, 2016, 3GPP TSG-RAN WG1 Meeting #86bis, Lisbon, Portugal, R1-1608957, 7 pages.

International Search Report and Written Opinion for International Application No. PCT/CN2017/072953 dated Jul. 26, 2017, 6 pages.

Huawei et al., "Key Principles for Support of Network Slicing in RAN," Oct. 10-14, 2016, 3 pages, 3GPP TSG-RAN WG2 Meeting #95bis, R2-166206, Kaohsiung, Taiwan.

Samsung, "End-to-End Network Slicing: RAN Requirements," Oct. 10-14, 2016, 3 pages, 3GPP TSG-RAN WG2 #195bis, R2-166917, Kaohsiung, Taiwan.

Ericsson, "Radio interface implications of network slicing," Oct. 10-14, 2016, 7 pages, 3GPP TSG-RAN WG2 #195bis, Tdoc R2-166931, Kaohsiung, Taiwan.

International Preliminary Report on Patentability for Application No. PCT/CN2017/072953, dated May 16, 2019, 5 pages.

Communication pursuant to Article 94(3) EPC for Application No. 17704155.5, dated Jul. 24, 2019, 4 pages.

Decision to Grant a Patent, EP App. No. 17704155.5, dated Aug. 20, 2020, 2 pages.

Examination Report, IN App. No. 201717005348, dated Feb. 24, 2020, 5 pages.

First Office Action, CN App. No. 201780067502.8, dated Sep. 18, 2020, 7 pages (4 pages of English Translation and 3 pages of Original Document).

Intention to Grant a Patent, EP App. No. 17704155.5, dated Apr. 22, 2020, 76 pages.

European Search Report and Search Opinion, EP App. No. 20183615.2, dated Oct. 12, 2020, 10 pages.

Fujitsu, "An NR Cell Deployment Scenario", 3GPP TSG-RAN WG2 Meeting #94, R2-163773, May 23-27, 2016, 3 pages.

Tesanovic et al., "Design Framework and Suitability Assessment Proposal for 5G air Interface Candidates", 2016 IEEE Conference on Standards for Communications and Networking (CSCN), 2016, 5 pages.

* cited by examiner

METHODS, BASE STATION AND USER EQUIPMENT

CROSS-REFERENCE TO RELATED APPLICATIONS

This application is a National stage of International Application No. PCT/CN2017/072953, filed Feb. 6, 2017, which claims priority to International Application No. PCT/CN2016/104646, filed Nov. 4, 2016, which are all hereby incorporated by reference.

TECHNICAL FIELD

Embodiments herein relate to wireless communication systems, such as cellular radio access networks. In particular, methods, a user equipment and a base station in a radio access network are disclosed. Corresponding computer programs and computer program carriers are also disclosed.

BACKGROUND

A radio access network (RAN) covers a geographical area which is divided into cell areas, wherein each cell area is served by a base station. A cell is the geographical area where radio coverage is provided by the base station at a base station site. The cells often overlap each other. One base station, situated on the base station site, may serve one or several cells. Further, each base station may support one or several communication technologies.

A radio access network, such as a $5^{th}$ Generation (5G) radio access network, is supposed to support multiple types of services using common RAN: enhanced mobile broadband (eMBB) services, massive machine type communication (mMTC) services and ultra-reliable and low latency communication (URLLC) services. These services require different Quality of Service (QoS), including delay, data rate and packet loss rate:

URLLC services require low delay and/or high reliability, but usually it also has very low data rate and possible sparse data transmission;

mMTC services typically require long battery lifetime but does not require low delay or high data rate, often combined with small infrequent packets; and eMBB services require high data rate. Delay can be strict but typically less strict than in URLLC.

FIG. 1 illustrates an example of using mixed numerologies over one Carrier Component (CC). There are two subbands, so called subband with narrow subcarriers and subband with wide subcarriers. Owing to the different numerologies used in the two subbands length of the subcarriers in the frequency domain are different for different subbands, and/or length of OFDM symbols in the time domain are different for different subbands. In order to fulfil the delay requirement of the different services, 3rd Generation Partnership Project (3GPP) RAN 1 group will introduce mixed numerologies in one carrier so that the services mentioned above may be served over one carrier. A subcarrier width may be $2^n \times 15$ kHz and the n is configurable.

Further, a so called slicing concept is being discussed in 3GPP. It will probably be used for commercial network. The slicing concept for core network is clear in 3GPP and evolving. However, how to support slicing concept in RAN side is still being discussed. One solution is to use different numerologies for different RAN slices over one carrier and enable dynamic or semi-static resource sharing between RAN slices in time-frequency domain. With such RAN slice definition, different Radio Access Bearer (RAB), corresponding to different QoS requirement, will be mapped to proper RAN slice that may optimize the QoS fulfillment.

SUMMARY

An object may be to improve flexibility of the above mentioned radio access network in order to fulfill QoS requirements for various service types, such as URLLC services, mMTC services, eMBB services or the like.

According to an aspect of the present disclosure, there is provided a method performed by a base station in a Radio Access Network, RAN. The base station maps a first Transmission Time Interval, TTI, configuration associated with a carrier of the RAN to a first RAN slice. The first RAN slice is configured to support a first Quality of Service, QoS, requirement. The first TTI configuration comprises a first number of Orthogonal Frequency-Division Multiplexing, OFDM, symbols. The base station maps a second TTI configuration associated with the carrier to a second RAN slice. The second RAN slice is configured to support a second QoS requirement different from the first QoS requirement. The second TTI configuration comprises a second number of the OFDM symbols. The second TTI configuration is different from the first TTI configuration. The OFDM symbols with respect to the first and the second RAN slices are defined according to a single numerology. The base station informs a user equipment, UE, of the first and second TTI configurations mapped respectively to the first and second RAN slices.

In an embodiment, the first and the second TTI configurations correspond to at least one of: a type of the UE, the first and second QoS requirements, and a type of a service.

In another embodiment, the informing further comprises informing the UE of a first and a second Downlink Control Information, DCI, search spaces corresponding to the first and the second RAN slices, respectively.

In yet another embodiment, the method further comprises mapping a single subband within the carrier to both the first and the second RAN slices. The single subband includes a number of subcarriers, and the subcarriers are defined according to said one numerology. The method also comprises informing the UE of the single subband mapped to the first and second RAN slices.

In yet another embodiment, the method further comprises mapping a first subband within the carrier to the first RAN slice, the first subband including a first number of subcarriers; and mapping a second subband within the carrier to the second RAN slice, the second subband including a second number of the subcarriers. The first subband is different from the second subband. The subcarriers with respect to the first and the second RAN slices are defined according to said one numerology. The method also comprises informing the UE of the first and the second subbands mapped to the first and second RAN slices.

In yet another embodiment, the first and the second TTI configurations comprise a TTI length based on the number of OFDM symbols therein. Alternatively, the first and second TTI configurations comprises the TTI length and any one of: a Downlink Control Information, DCI, search space; a DCI format; a Uplink Control Information, UCI, search space; a UCI format; a channel state information, CSI, measurement; a CSI measurement report; a Status Report, SR; and a buffer status report.

According to another aspect of the present disclosure, there is provided a method performed by a user equipment, UE, for accessing a Radio Access Network, RAN. The UE receives a first and a second Transmission Time Interval, TTI, configurations mapped respectively to a first and a second RAN slices. The first RAN slice is configured to support a first Quality of Service, QoS, requirement. The second RAN slice is configured to support a second QoS requirement different from the first QoS requirement. The first TTI configuration comprises a first number of Orthogonal Frequency-Division Multiplexing, OFDM, symbols, and is associated with a carrier of the RAN. The second TTI configuration includes a second number of the OFDM symbols and associates with the carrier. The second TTI configuration is different from the first TTI configuration. The OFDM symbols with respect to the first and the second RAN slices are defined according to one numerology.

According to a further aspect of the present disclosure, there is provided a base station operable in a Radio Access Network, RAN. The base station comprises a first mapping module configured to map a first Transmission Time Interval, TTI, configuration associated with a carrier of the RAN to a first RAN slice. The first RAN slice is configured to support a first Quality of Service, QoS, requirement. The first TTI configuration comprises a first number of Orthogonal Frequency-Division Multiplexing, OFDM, symbols. The base station comprises a second mapping module configured to map a second TTI configuration associated with the carrier to a second RAN slice. The second RAN slice is configured to support a second QoS requirement different from the first QoS requirement. The second TTI configuration comprises a second number of the OFDM symbols. The second TTI configuration is different from the first TTI configuration. The OFDM symbols with respect to the first and the second RAN slices are defined according to one numerology. The base station comprises a first informing module configured to inform a user equipment, UE, of the first and second TTI configurations mapped respectively to the first and second RAN slices.

According to yet another aspect of the present disclosure, there is provided a user equipment, UE, for accessing to a Radio Access Network, RAN. The UE comprises a first receiving module configured to receive a first and a second Transmission Time Interval, TTI, configurations mapped respectively to a first and a second RAN slices. The first RAN slice is configured to support a first Quality of Service, QoS, requirement. The second RAN slice is configured to support a second QoS requirement different from the first QoS requirement. The first TTI configuration comprises a first number of Orthogonal Frequency-Division Multiplexing, OFDM, symbols, and is associated with a carrier of the RAN. The second TTI configuration includes a second number of the OFDM symbols and associates with the carrier. The second TTI configuration is different from the first TTI configuration. The OFDM symbols with respect to the first and the second RAN slices are defined according to one numerology.

According to further aspects of the present disclosure, computer programs and computer program carriers corresponding to the aspects above are provided.

An advantage is that, compared to RAN slice definition using mixed numerologies, the embodiments herein clearly have lower complexity owing to only one numerology is employed to define the OFDM symbol in time domain.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
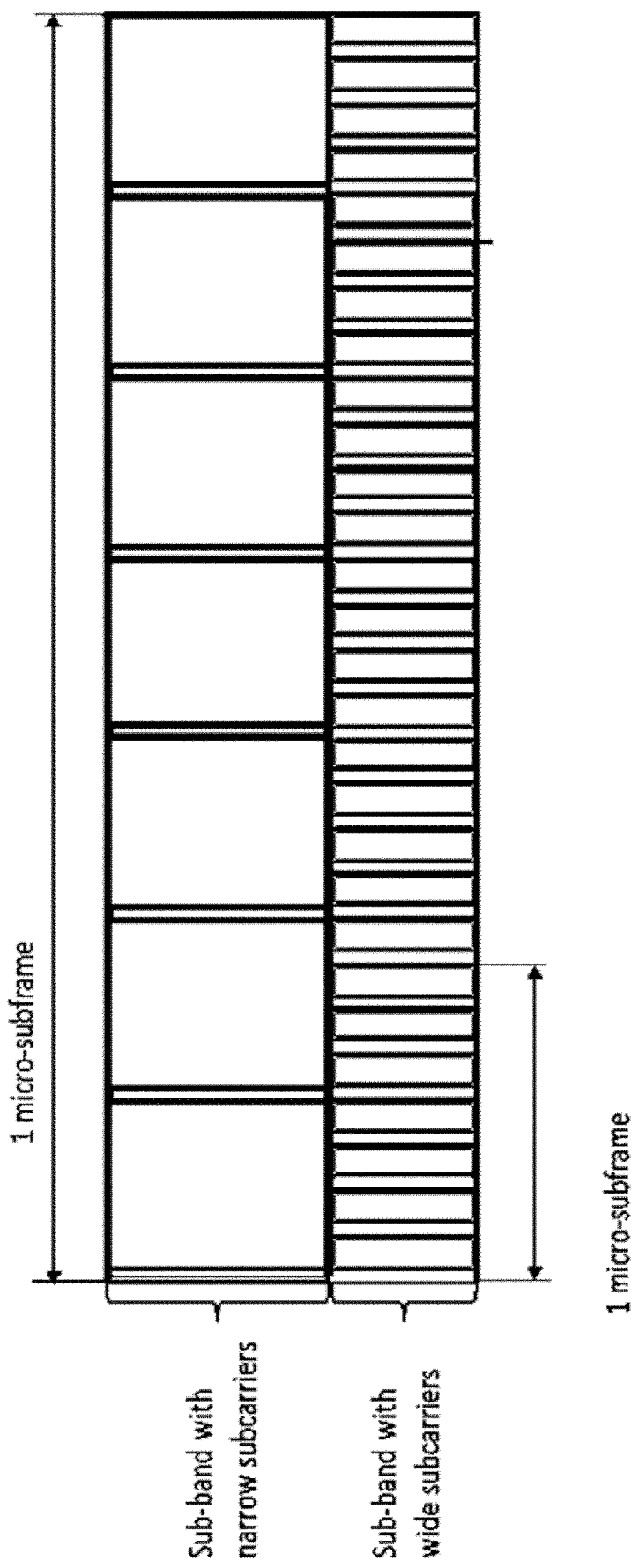
FIG. 1 is a schematic illustration of sub-bands including narrow and wide subcarriers according to prior art.

Throughout the following description similar reference numerals have been used to denote similar features, such as nodes, actions, modules, circuits, parts, items, elements, units or the like, when applicable. In the Figures, features that appear in some embodiments are indicated by dashed lines.

As mentioned above in relation to FIG. 1, mixed numerologies for subcarriers may be used for different sub-bands in order to support slicing in the RAN.

When mixed numerologies are used, many technical issues need to be investigated: sync signal/system information design and monitoring, guard band between different numerologies, DCI search space and scheduling, filtering of mixed numerologies, random access, mobility and power control, etc. These aspects may be discussed in 3GPP step by step and the product development would take even longer time. Further, if RAN slicing is supported by use of mixed numerologies configuration, a UE that operates multiple services, belonging to different slices, may need to support multiple numerology operation. Considering the mentioned complexity of mixed numerologies, the present inventors have realized that a less complex but elegant solution for mixed services according to slicing concept may be achieved with the embodiments as disclosed herein.

Meeting the different delay requirement in RAN by means of mixed numerologies in one carrier requires complex standardization effort and production design. The embodiments herein propose methods to meet the various delay requirements using RAN slice definition based on TTI length, which may be dynamically adjusted, instead of using mixed numerologies so as to avoid the complexity described above.

Figure 2:
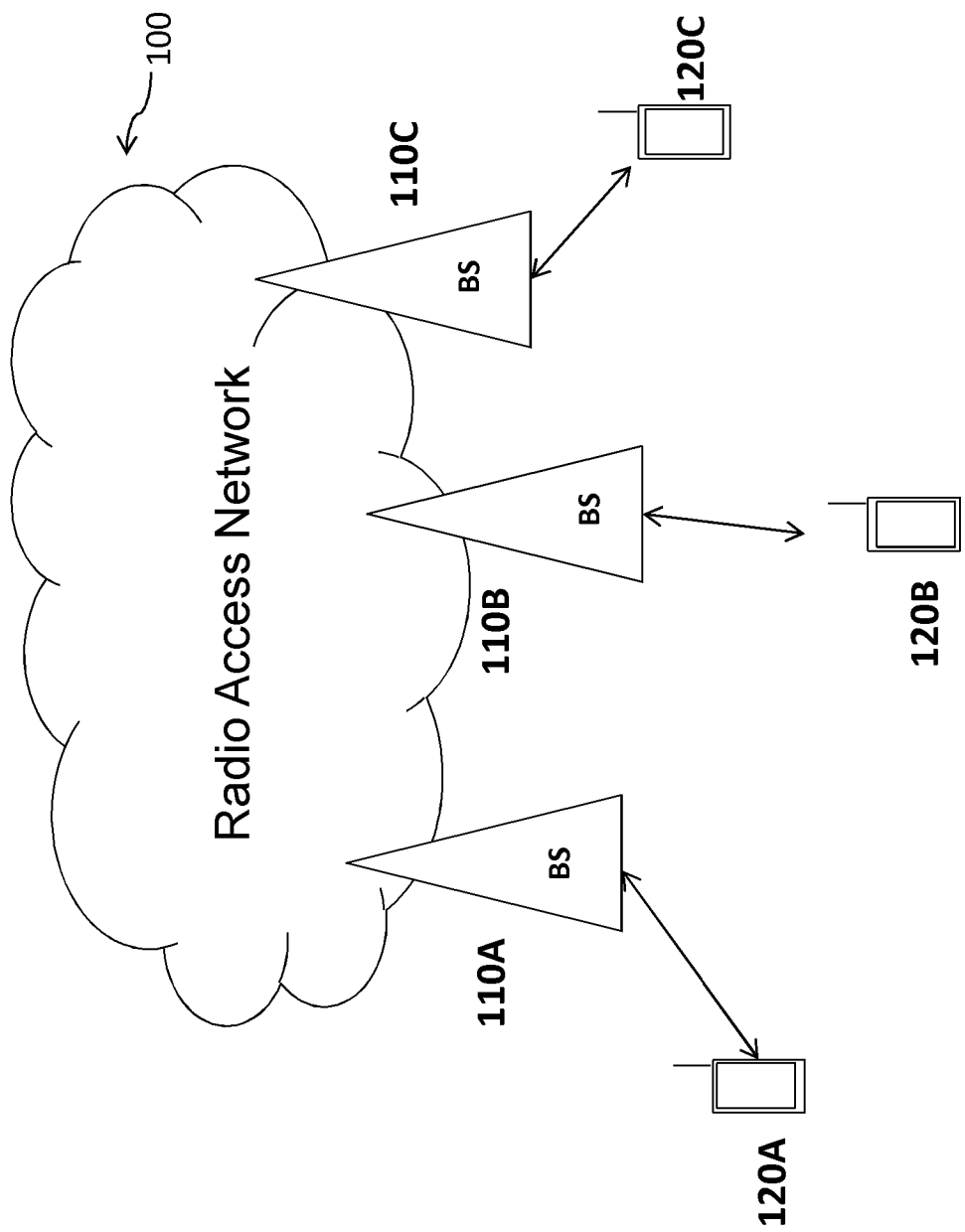
FIG. 2 is a schematic overview of an exemplifying radio access network in which embodiments herein may be implemented.

FIG. 2 depicts an exemplifying radio access network 100 in which embodiments herein may be implemented.

The network 100 may be any cellular or wireless communication network, such as Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, or a Wideband Code Division Multiple Access (WCDMA), Universal Terrestrial Radio Access (UTRA) TDD, Ultra-Mobile Broadband (UMB), Global System for Mobile communications (GSM) network, GSM/Enhanced Data Rate for GSM Evolution (EDGE) Radio Access Network (GERAN) network, EDGE network, a network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), 5G or New Radio (NR) system or any cellular network or system.

The network 100 comprises at least one base station (BS), also referred to as access node, 110A, 110B, 110C. The base stations 110A, 110B, 110C communicate over an air interface, namely cellular interface, operating on radio frequencies with a User Equipment (UE), 120A, 120B, 120C, within range of the base stations 110A, 110B, 110C.

The UE, 120A, 120B, 120C may be a mobile terminal or a wireless terminal, a mobile phone, a computer such as e.g. a laptop, a Personal Digital Assistants PDAs or a tablet computer, sometimes referred to as a surf plate, with wireless capability, or any other radio network units capable to communicate over a radio link in a wireless communications network. Please note that the term UE used in this document also covers other wireless devices such as Machine to machine (M2M) devices, even though they do not have any user.

The base station 110A, 110B, 110C may map a different Transmission Time Interval (TTI) configuration associated with a carrier of the RAN 100 to different RAN slices, respectively. Each RAN slice is configured to support a Quality of Service (QoS) requirement. The TTI configurations are different at different TTI lengths, which are based on a quantity of Orthogonal Frequency-Division Multiplexing (OFDM) symbols. The OFDM symbols with respect to all the RAN slices are defined according to a single numerology.

The base station 110A, 110B, 110C may also be, e.g. a Radio Base Station (RBS), which sometimes may be referred to as e.g. "eNB", "eNodeB", "NodeB", "B node", gNodeB or BTS (Base Transceiver Station), depending on the technology and terminology used. The base stations may be of different classes such as e.g. macro eNodeB, home eNodeB or pico base station, based on transmission power and thereby also cell size.

Example of embodiments of a method performed by a base station 110A, 110B, 110C will now be described with reference to FIG. 3. The base station 110A, 110B, 110C is operable in a Radio Access Network (RAN) 100.

The method may comprise the following actions, which actions may be taken in any suitable order.

Action 310

The base station 110A, 110B, 110C may map a first TTI configuration associated with a carrier of the RAN 100 to a first RAN slice. The first RAN slice is configured to support a first QoS requirement. The first TTI configuration may comprise a first number of OFDM symbols.

Action 320

The base station 110A, 110B, 110C may map a second TTI configuration associated with the carrier to a second RAN slice. The second RAN slice is configured to support a second QoS requirement different from the first QoS requirement. The second TTI configuration may comprise a second number of the OFDM symbols. The second TTI configuration may be different from the first TTI configuration. As an example, at least one of delay, data rate, packet loss rate and the like of the first and second QoS requirements are different.

The OFDM symbols with respect to the first and the second RAN slices may be defined according to one numerology.

According to some embodiments, the first and the second TTI configurations may comprise a TTI length, which is based on the number of OFDM symbols therein; or the TTI length and any one of: a Downlink Control Information, DCI, search space; a DCI format; a Uplink Control Information, UCI, search space; a UCI format; a channel state information, CSI, measurement; a CSI measurement report; a Status Report, SR; and a buffer status report.

Action 330

The base station 110A, 110B, 110C may inform a UE 120A, 120B, 120C of the first and second TTI configurations mapped respectively to the first and second RAN slices.

According to some embodiments, the first and the second TTI configurations may correspond to at least one of: a type of the UE, the first and second QoS requirements, and a type of a service.

According to some embodiments, the informing Action 330 may further comprise: informing the UE of a first and a second Downlink Control Information, DCI, search spaces corresponding to the first and the second RAN slices, respectively.

According to some embodiments, the informing Action 330 may be performed by using a Downlink Control Information (DCI) message.

According to some embodiments, the base station 110A, 110B, 110C may also map a subband to the first and the second RAN slices. Several embodiments of mapping the subband to the first and the second RAN slices will be discussed here. A first embodiment is illustrated in actions 340 and 350 and a second embodiment is illustrated in actions 360. The first embodiment maps different RAN slices to different subbands and the second embodiment maps different RAN slices to a single subband.

Action 340

The base station 110A, 110B, 110C may map a first subband within the carrier to the first RAN slice, the first subband including a first number of subcarriers.

Action 350

The base station 110A, 110B, 110C may map a second subband within the carrier to the second RAN slice. The second subband including a second number of the subcarriers. The first subband is different from the second subband. The subcarriers with respect to the first and the second RAN slices are defined according to said one numerology.

Action 360

The base station 110A, 110B, 110C may map a single subband within the carrier to both the first and the second RAN slices. The single subband including a number of subcarriers, wherein the subcarriers are defined according to said one numerology.

Action 370

The base station 110A, 110B, 110C informs the UE of the subband mapped according to the above mentioned first and second embodiments. The informing may be performed by using any known signaling, including broadcast signaling. The informing of the subband may be performed lower frequent than the informing of the TTI configuration mentioned above.

In case of the first embodiment(s), the base station 110A, 110B, 110C informing (370) the UE of the first and the second subbands mapped to the first and second RAN slices. With respect to the second embodiment(s), the base station 110A, 110B, 110C informs the UE of the single subband mapped to the first and second RAN slices.

Action 380

Based on the above configuration of the first and second RAN slices, the base station 110A, 110B, 110C may transmit data having the first and the second QoS requirements in the first and the second RAN slices, respectively, to the UE.

Figure 3:
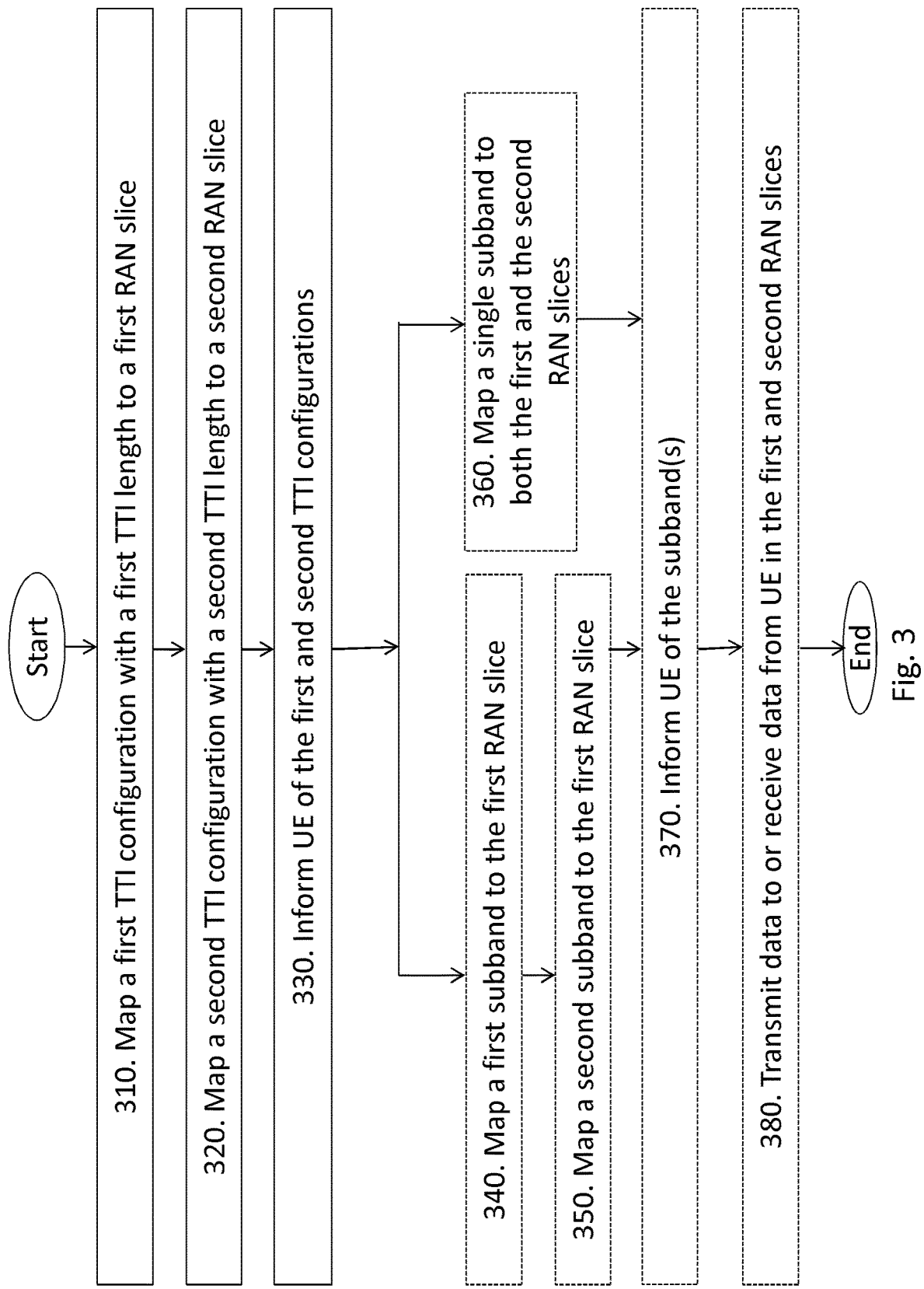
FIG. 3 is a flowchart illustrating embodiments of the method in the base station.

To perform the method embodiments corresponding to FIG. 3, the base station, shown as access node 110A, 110B, 110C of FIG. 2 is disclosed herein. The base station 110A, 110B, 110C may comprise the following arrangement depicted in FIG. 4. As mentioned above, the base station 110A, 110B, 110C is operable in the RAN 100.

The base station 110A, 110B, 110C is configured, e.g. by means of a first mapping module 410, to map the first TTI configuration associated with the carrier of the RAN 100 to the first RAN slice.

The base station 110A, 110B, 110C is also configured, e.g. by means of a second mapping module 420, to map the second TTI configuration associated with the carrier of the RAN 100 to the second RAN slice.

The base station 110A, 110B, 110C is also configured, e.g. by means of a first informing module 430, to inform the UE of the first and second TTI configurations mapped respectively to the first and second RAN slices.

According to some embodiments, the first informing module 430 is further configured to inform the UE of the first and the second DCI search spaces corresponding to the first and the second RAN slices, respectively.

According to some embodiments, the first informing module 430 is further configured to inform the UE of the first and second TTI configurations, and the first and the second DCI search spaces by using the DCI message.

According to some embodiments, the base station 110A, 110B, 110C is further configured, e.g. by means of a third mapping module 440, to map the single subband within the carrier to both the first and the second RAN slices; and e.g. by means of a second informing module 470, to inform the UE of the single subband mapped to the first and second RAN slices.

According to some embodiments, the base station 110A, 110B, 110C is further configured, e.g. by means of a fourth mapping module 450, to map the first subband within the carrier to the first RAN slice; and e.g. by means of a fifth mapping module 460, to map the subband within the carrier to the first RAN slice; and e.g. by means of a third informing module 480, to inform the UE of the first and the second subbands mapped to the first and second RAN slices.

According to some embodiments, the base station 110A, 110B, 110C is further configured, e.g. by means of a transmission module 490, to transmit data to or receive data from the UE in the first and second RAN slices.

In some embodiments, the base station 110A, 110B, 110C may comprise a processing module 401, such as a means for performing the methods described herein. The means may be embodied in the form of one or more hardware modules and/or one or more software modules.

In some embodiments, the processing module 401 may comprise one or more of the first mapping module 410, the second mapping module 420, the first informing module 430, the third mapping module 440, the fourth mapping 450, the fifth mapping module 460, the second informing module 470, the third informing module 480, and the transmission module 490 as exemplifying hardware modules. In other examples, one or more of the aforementioned exemplifying hardware modules may be implemented as one or more software modules.

The base station 110A, 110B, 110C may further comprise a memory 402. The memory may comprise, such as contain or store, instructions, e.g. in the form of a computer program 403, which may comprise computer readable code units.

According to some embodiments herein, the base station 110A, 110B, 110C and/or the processing module 401 comprises a processing circuit 404 as an exemplifying hardware module, which may comprise one or more processors. Accordingly, the processing module 401 may be embodied in the form of, or 'realized by', the processing circuit 404. The instructions may be executable by the processing circuit 404, whereby the base station 110A, 110B, 110C is operative to perform the methods of FIG. 3. As another example, the instructions, when executed by the base station 110A, 110B, 110C and/or the processing circuit 404, may cause the base station 110A, 110B, 110C to perform the method according to FIG. 3.

Figure 4:
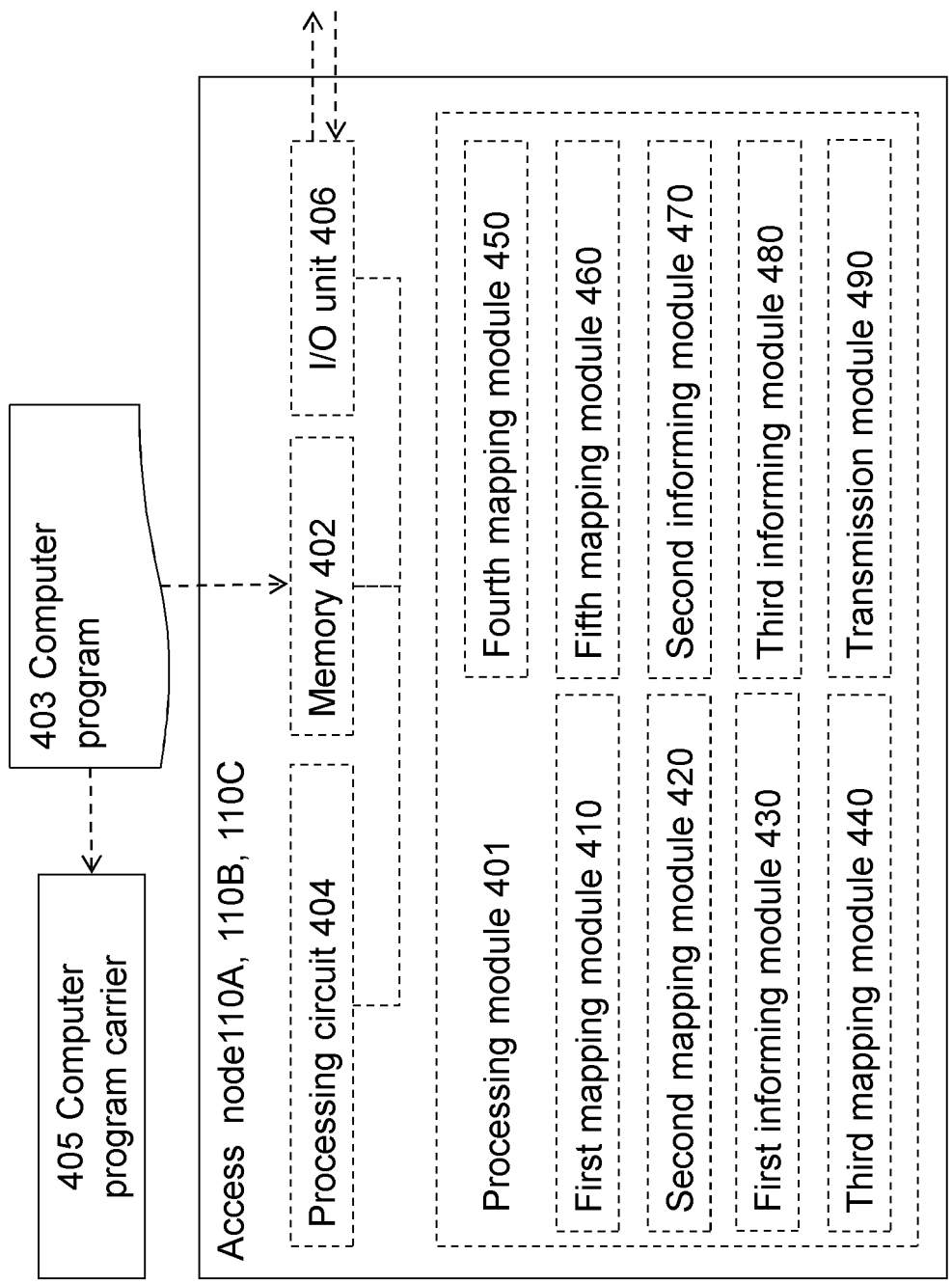
FIG. 4 is a block diagram illustrating embodiments of the base station.

FIG. 4 further illustrates a computer program carrier 405, or program carrier, which comprises the computer program 403 as described directly above.

Moreover, base station 110A, 110B, 110C may further comprise an Input/Output unit 406, which may be exemplified by the receiving module and/or the sending module as described below when applicable.

Now returning to the first embodiment, in which an explicit RAN slice definition is provide by use of different TTI lengths for different subbands within the carrier.

Figure 5:
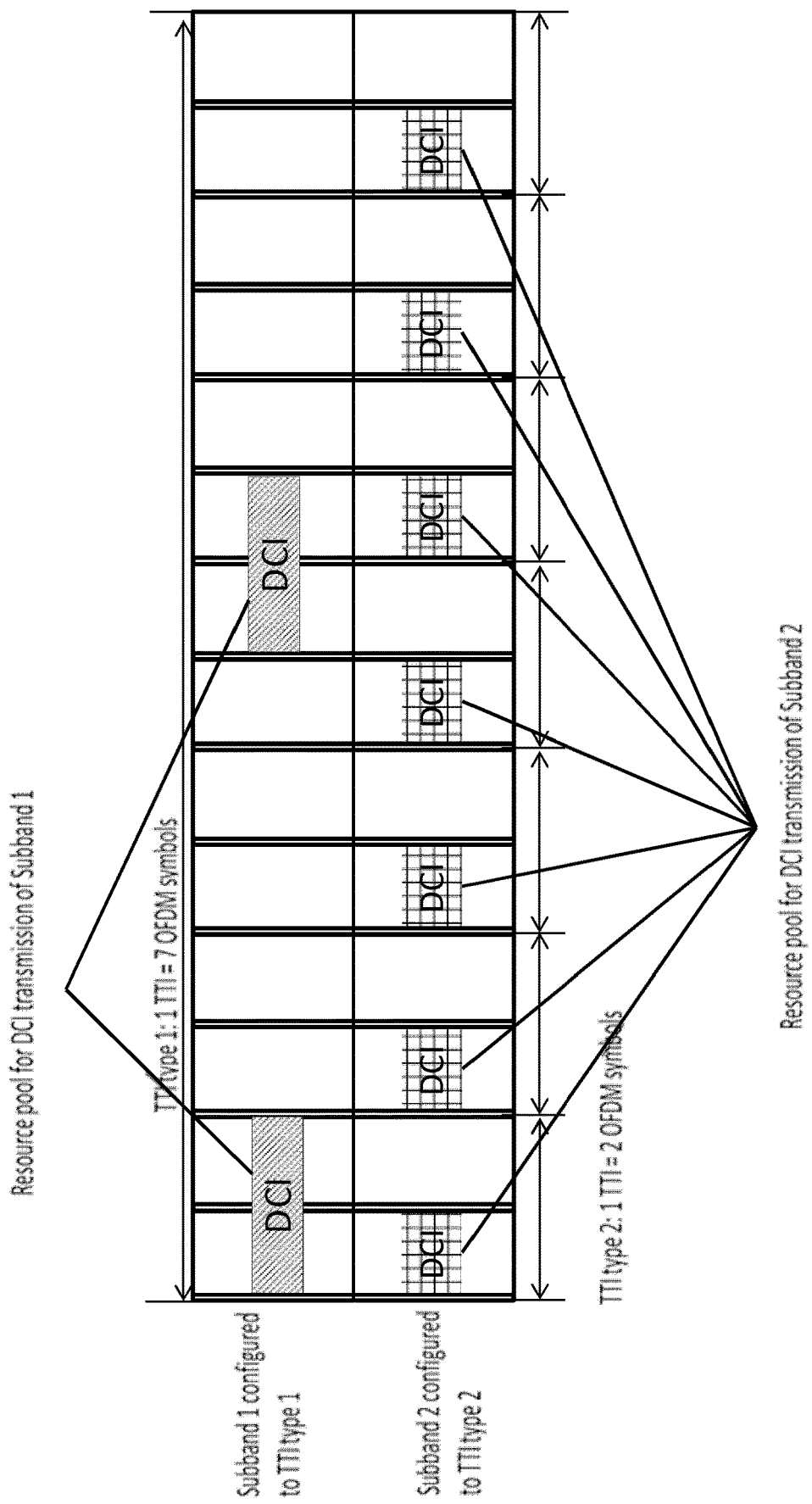
FIG. 5 is a further schematic illustration of sub-bands according to an embodiment herein.

According to these embodiments, one carrier may be divided into more than one subband, where all subcarriers in said more than one subband have the same numerology. Each subband may comprise different number of subcarriers or the same number, as shown in FIG. 5, and different subbands are configured to different TTI lengths. The TTI length is thus given by a number of OFDM symbols included in the TTI. Each subband may be regarded as one RAN slice in this case. This means that each subband is associated with a respective RAN slice, where the respective RAN slice supports services having a certain QoS requirement. FIG. 5 illustrates one example. In the figure, there are Subband 1 and 2, which are configured to TTI type 1 and 2 respectively. TTI types 1 and 2 have 7 and 2 Orthogonal Frequency-Division Multiplexing (OFDM) symbols respectively. Subband 1 may support high data rate for eMBB services and Subband 2 may support high reliability and low delay services. There are separate resource pools for Downlink Control Information (DCI) transmission for different subbands. UE specific DCI search space is allocated from the respective resource pool for DCI transmission.

As mentioned above, the second TTI configuration may be different from the first TTI configuration. As an example, the first number of OFDM symbols is different from the second number of OFDM symbols. Thus, the first and second TTI configurations differ from each other.

The first subband is different from the second subband by having different number of subcarriers, by having different frequencies, or both. For instance, different sub-bands may be not overlap, and may comprise different number of the subcarriers defined by the single one numerology.

According to some embodiments, the method further comprises configuring a same Demodulation Reference Signal, DRS, signal, and/or a same random access procedure for both the first and second sub-bands.

As an example, this means that different subbands may have shared Demodulation reference signal (DRS) signals such as sync signal and mandatory system information transmission. The UEs served by different subbands may monitor the same DRS signal for mobility management.

According to some embodiments, the method further comprises configuring the following sub-band specific parameters with respect to at least one of the first and second sub-bands for each sub-band: Downlink Control Information search space, Downlink Control Information format, transport format table, scheduling scheme, Channel State Information, CSI, measurement and report, Uplink Control Information format, Uplink Control Information transmission and resource mapping, timing for uplink scheduling.

As an example, each subband has respective DCI search space configurations. Since typically there is one search space in each TTI, it is impossible to share the DCI search space configuration between different subbands with different TTI lengths.

As an example, different subbands may have different resource granularity configurations. For instance, one PRB may include 12 subcarriers in subband 1 and 6 subcarriers for subband 2.

As an example, each subband may be configured with specific transport format table. For instance, for URLLC traffic, it is not so promising to have high order modulation, high coding rate or high rank transmission compared to eMBB traffic. More, since there may be high probability of small packet transmission, it is beneficial to improve the TB size granularity for RAN slice for small packets for URLLC services.

As an example, each subband has specific DCI format configuration. Taking into consideration of the above embodiments, the DCI format for different subbands may be separately configured for each UE.

As an example, scheduling scheme for different subband may be configured respectively. As one example, multiple subframe scheduling may be configured for subband 1 for eMBB traffic while not configured for subband 2 for URLLC traffic. As one more example, proportional fair scheduling scheme may be configured for Subband 1 while delay critical scheduling scheme may be configured for subband 2.

Channel state information (CSI) measurement and report for different subband may be separately configured. Thus, for subband 1 to provide MBB services, the UE may be configured to evaluate the rank, precoding matrix and the CQI for each stream. For subband 2 to provide URLLC services, one would probably always use Rank 1 transmission, the TRP may configure the UE to evaluate the precoding matrix and CQI only.

Uplink Control Information (UCI) format, transmission and resource mapping may be subband specific. Hence, since the data transmission scheme, scheduling scheme and data rate for services operated in different subbands are very different, the time and frequency resources to send the scheduling request, the number of HARQ A/N bits, the time to send the HARQ feedback, the number of CSI bits and the time to send the CSI report are quite different for different subbands. Hence different UCI configurations are needed for different subbands. It is desired to configure the UCI format, transmission and resource mapping for different subbands respectively.

As an example, timing for uplink scheduling may be subband specific. This may mean that the time from SR receiving to UL grant transmission and the time from UL grant transmission from UL grant receiving to UL data transmission may be different and separately configured for different subbands because of the TTI length difference.

As an example, a common random access procedure may be used for UEs to access different subbands. This may imply that a default TTI length may be predefined and any UE may access the network via common random access procedure and then switch to preferred subband according to the UE type or traffic type.

Turning to the second embodiment mentioned above, explicit RAN slice definition is achieved by use of different TTI lengths within the same subband.

According to these embodiments, RAN slices are mapped to different TTI length as with the first embodiment, but the RAN slices are multiplexed in the same subband. This setup has the advantage that the size, i.e. number of resources used by the RAN slice, of the RAN slice may dynamically be changed. This embodiment provides for how to handle if time-frequency resources occupied by an already ongoing transmission 1, in a "long TTI" RAN slice, suddenly are now needed for an urgent transmission 2 in a "short TTI" RAN slice. In this context, the terms "long" and "short" are relatively each other with respect to number of OFDM symbols in the TTIs of the respective RAN slices. Due to the urgency of the transmission 2 obviously transmission 2 overwrites transmission 1 in the colliding resources. Solutions to mitigate the impact on transmission 1 are to send a signal to receiver of transmission 1 indicating the puncturing, special coding solutions such as outer codes, or retransmission schemes. With respect to the embodiments above, the TTI length and the associated parameters may be configured for a UE according to the UE type or the traffic type for the UE. As an example, UE 1 requesting a delay critical service is configured to short TTI length with 2 OFDM symbols; while UE 2 requesting the eMBB services is configured to TTI length with 7 OFDM symbols.

According to the embodiments above, TTI configuration may be performed in a static way, a dynamic way or both.

Option 1: UE specific Static TTI length configuration, also referred to as TTI length schedule according to UE type or traffic type As one option, the informing Action 330 is performed by using at least one of: a Radio Resource Control message, a MAC Control Element, and a Downlink Control Information.

For this option, the TTI length and the associated parameters may be configured for a UE according to the UE type or the traffic type for the UE by using a Radio Resource Control (RRC) message or MAC Control Element (MAC CE). The associated parameters include a DCI search space and format, a UCI search space and format, a CSI measurement and report parameters, a Status Report (SR) and buffer status report parameters etc. The configuration can be finished during the session setup procedure for a UE according to the UE or traffic type. As one example, UE 1 requesting a delay critical service is configured to short TTI length with 2 OFDM symbols; while UE 2 requesting the eMBB services is configured to TTI length with 7 OFDM symbols.

Figure 6:
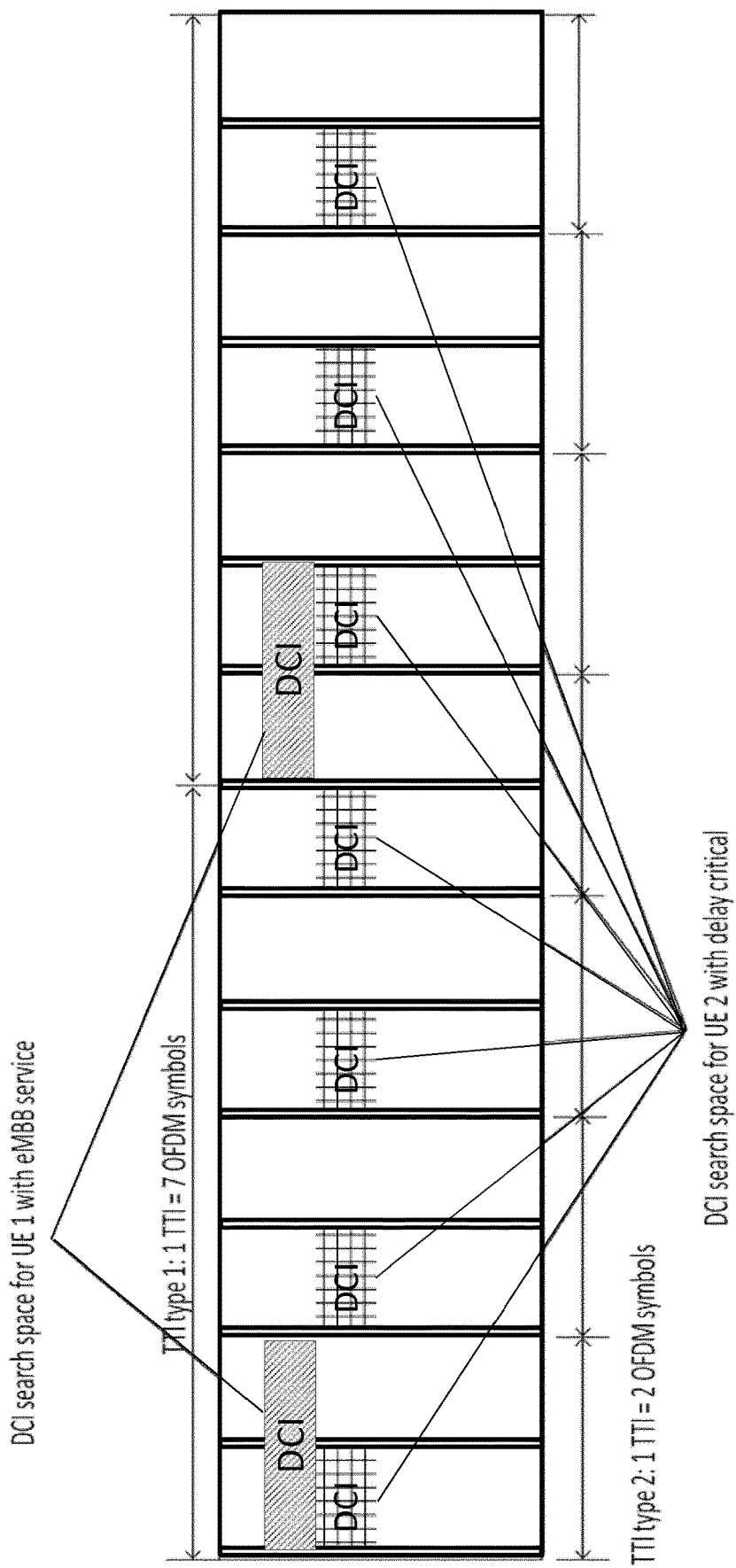
FIG. 6 is another schematic illustration of a sub-band according to another embodiment herein.

FIG. 6 shows the example of RAN slice definition using TTI length and same subband, UE specific TTI length configuration and a corresponding DCI search space. UE1 with eMBB service uses long TTI length while UE 2 with delay critical services uses short TTI length.

Option 2: dynamic scheduled TTI configuration length using DCI

As another option, the informing Action 330 is performed by using DCI message which is in a new format proposed by the disclosure.

For this option, the TTI length for a UE is dynamically configured using DCI command/message. Specific DCI format to indicate the TTI length and the specific DCI search space for the specific DCI transmission may be configured for UE. After the UE decodes the DCI, the UE knows the TTI length and performs the data decoding according to the determined TTI length. The DCI format configuration informs the UE whether the flexible TTI length is applied for the UE or not. For dynamic scheduled TTI length, the DCI search space occurrences may be configured according to the short TTI length so that each short TTI may have at least one DCI search space occurrence.

In some examples, DCI search space configuration is notified to and used by the UE. FIG. 6 further illustrates an example of a DCI search space configuration with respect to dynamic scheduled RAN slice TTI length, the DCI search space occurrences may be configured according to the short TTI length so that each short TTI may have at least one DCI search space occurrence. As shown in FIG. 6, UE 1 uses DCI search space for eMBB service, shown as striped DCI, and UE 2 uses DCI search space, for delay critical service, shown as meshed DCI.

Figure 7:
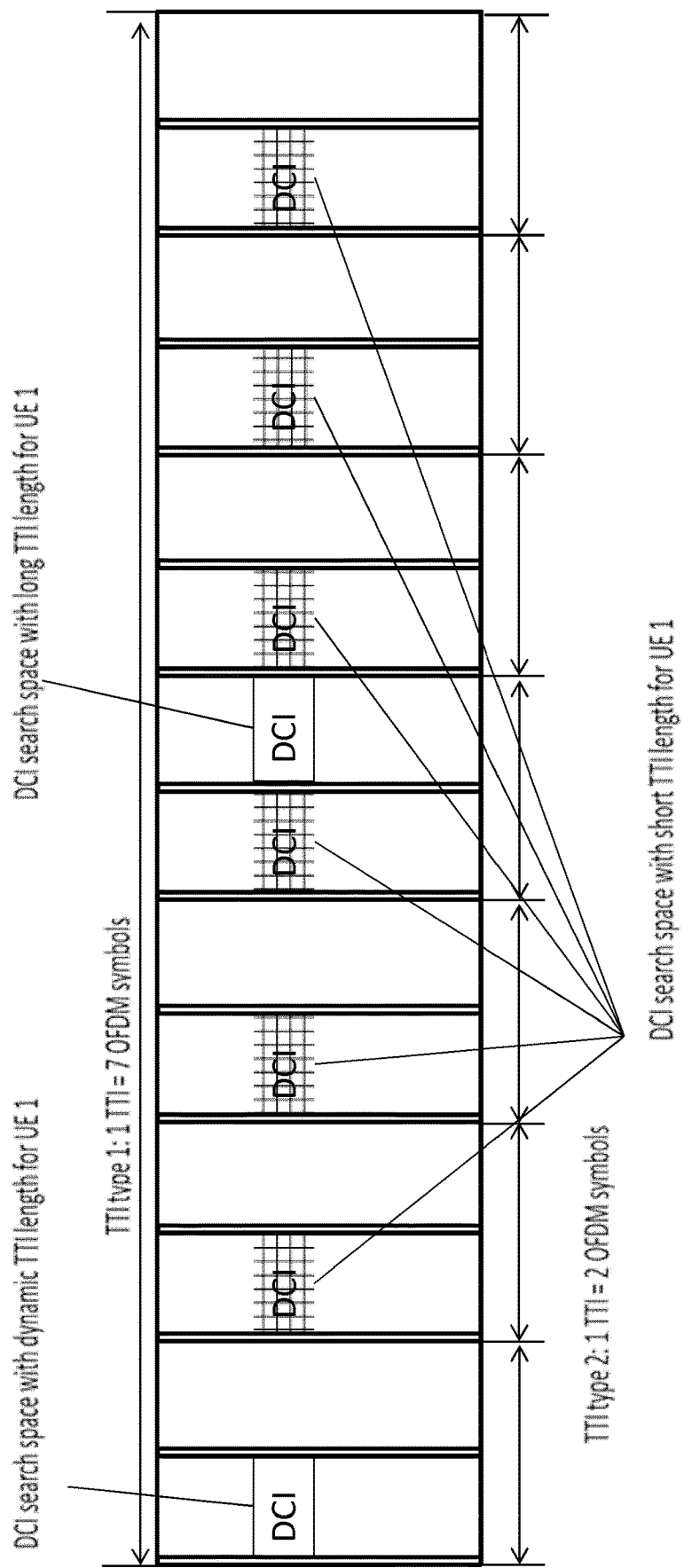
FIG. 7 is a still other schematic illustration of a sub-band according to a still other embodiment.

FIG. 7 shows another example of a DCI search space configuration example for with respect to dynamic scheduled RAN slice for UE 1 with dynamic TTI length. In this figure, there is a shared DCI search space when there is aligned TTI boundary. The DCI search space occurrence for short TTI scheduling is more frequent. As an example shown in FIG. 6, for the first RAN slice, shown as long TTI length in the figure, where M=7*OFDM, the DCI search space occurrence is 7. For the second RAN slice, shown as short TTI length in the figure, where N=2*OFDM, the DCI search space occurrence is 2.

Compared to option 1, the TTI length adaptation is more dynamical. This also puts certain requirement on the signaling processing in the UE side due to TTI length change also means that the signal processing for data receiving may be adapted accordingly.

Option 3: A combination of the above Static and dynamic TTI configuration, which is also referred to as "semi-static TTI configuration". In this case, the TTI may begin with the Static TTI configuration, then dynamically updated according to the dynamic TTI configuration.

Example of embodiments of a method performed by the user equipment, UE, 120A, 120B, 120C for accessing to a Radio Access Network (RAN) 100 will now be described with reference to FIG. 8.

The method may comprise the following actions, which actions may be taken in any suitable order.

Action 810

The UE 120A, 120B, 120C may receive the first and the second TTI configurations mapped respectively to the first and the second RAN slices, from the base station. As the first and the second TTI configurations, and the first and the second RAN slices have been discussed in the embodiment corresponding to FIG. 3, they will not be repeated again.

In case the informing Action 330 performed by the base station is done by the DCI message, the receiving Action 810 is performed by using the DCI message accordingly.

With respect to subband, corresponding to the base station 110A, 110B, 110C embodiment, the UE 120A, 120B, 120C may receive an indication of the subband mapped to the first and the second RAN slices. Several alternatives of receiving the subband mapped to the first and the second RAN slices will be discussed here.

In case of the base station maps different RAN slices to a single subbands, Action 820 as follows will be performed.

Action 820

The UE 120A, 120B, 120C may receive an indication of the above single subband within the carrier mapped to both the first and the second RAN slices.

In case the base station maps different RAN slices to different subbands, following Actions 830 and 840 will be performed.

Action 830

The UE 120A, 120B, 120C may receive an indication of the above first subband within the carrier mapped to the first RAN slice.

Action 840

The UE 120A, 120B, 120C may receive an indication of the above second subband within the carrier mapped to the second RAN slice.

Action 850

According to some embodiment, the UE 120A, 120B, 120C may search the DCI in the DCI search space, which will be discussed in FIGS. 6 and 7.

Action 860

After knowing the first and the second RAN slice, the UE 120A, 120B, 120C may transmit data to or receive data from base station in the first and second RAN slices.

In view of the above, the following further embodiments relating to the UE may be contemplated.

As an embodiment, the UE may receive the configured RAN slice configuration, including TTI configuration, subband bandwidth and measurement configuration from the network and selects the RAN slice for service providing according to the UE type or the type of service based on predefined rules.

As another embodiment, the UE may report the UE type to the network, and the UE determine the slice to be used based on a set of parameters received from the network including the subband bandwidth, the TTI configuration and measurement configurations.

As one further embodiment, when the UE is served by more than one RAN slice, one measurement and/or report configuration may be shared by the more than one RAN slice.

As a further embodiment, when dynamical flexible TTI length is configured for a UE, the UE may be configured to use new DCI format in which the TTI length indicator is carried.

As a further embodiment, when dynamical flexible TTI length is configured for a UE being served by a RAN slice, the UE may be configured to monitor each DCI search space respectively for each RAN slice.

As a further embodiment, when dynamical flexible TTI length is configured for a UE being served by a RAN slice, the UE may be configured to monitor joint DCI search space for different TTI length.

As a further embodiment, when dynamical flexible TTI length is configured for a UE being served by a RAN slice, the UE may be configured to one measurement and measurement report configuration irrespective of TTI length.

As a further embodiment, when dynamical flexible TTI length is configured for a UE being served by a RAN slice, the UE may be configured to one measurement and measurement report configurations according to the shortest TTI length.

Figure 8:
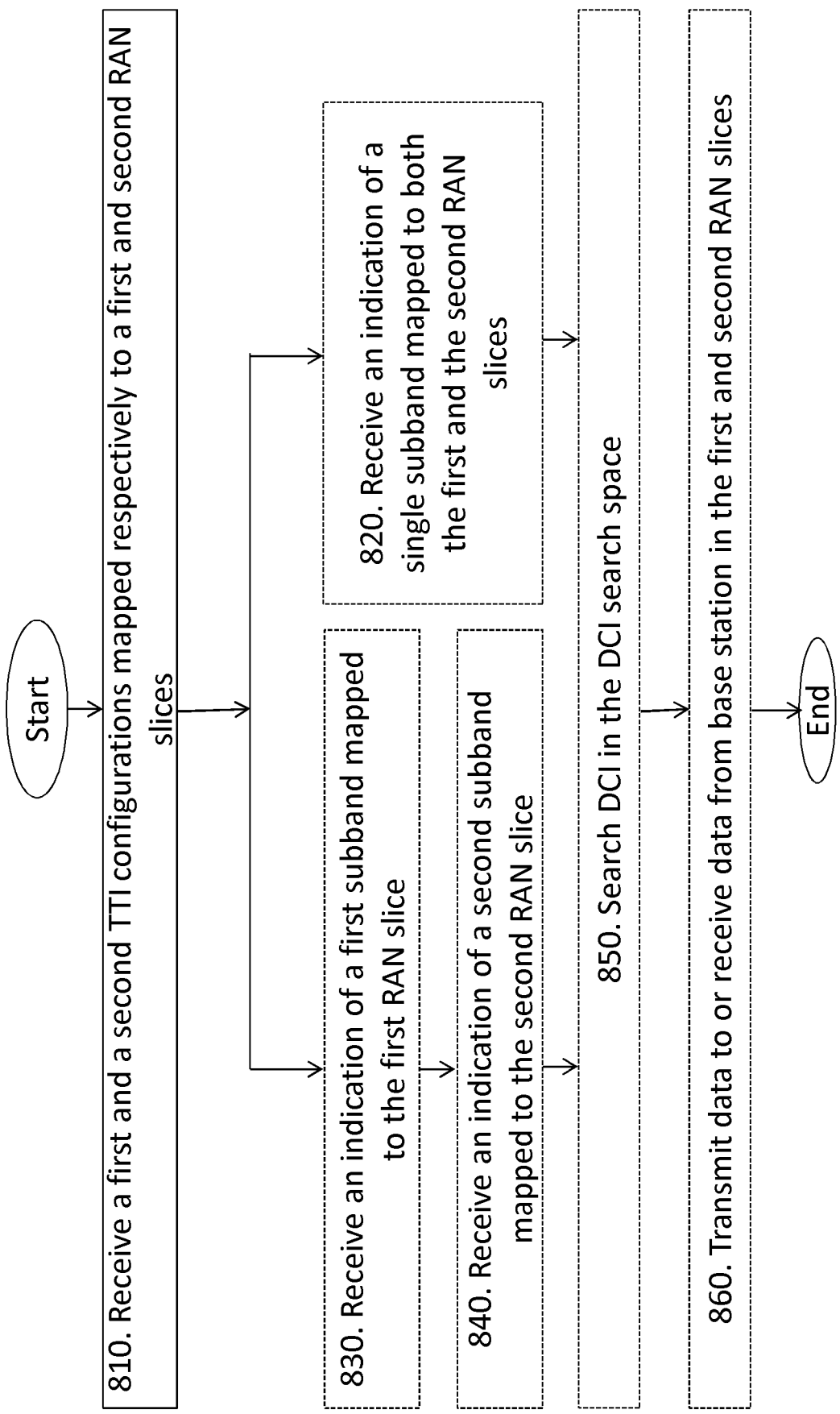
FIG. 8 is a flowchart illustrating embodiments of the method in the user equipment.

To perform the method embodiments corresponding to FIG. 8, the UE 120A, 120B, 120C of FIG. 2 is shown is discussed herein. The UE 120A, 120B, 120C may comprise the following arrangement depicted in FIG. 9 for accessing the RAN 100.

The UE 120A, 120B, 120C is configured, e.g. by means of a first receiving module 910, to receive the first and the second TTI configurations mapped respectively to the first and the second RAN slices.

According to some embodiments, the first receiving module 910 is further configured to receive the first and the second DCI search spaces corresponding to the first and the second RAN slices, respectively.

According to some embodiments, the first receiving module 910 is further configured to: receive the first and second TTI configurations, and the first and the second DCI search spaces by using the DCI message.

According to some embodiments, the UE 120A, 120B, 120C is further configured, e.g. by means of a second receiving module 920, to receive the indication of a single subband within the carrier mapped to both the first and the second RAN slices.

According to some embodiments, the UE 120A, 120B, 120C is further configured, e.g. by means of a third receiving module 930, to receive the indication of a first subband within the carrier mapped to the first ran slice; and e.g. by means of a fourth receiving module 940, to receive the indication of a second subband within the carrier mapped to the second RAN slice.

According to some embodiments, the UE 120A, 120B, 120C is further configured, e.g. by means of a searching module 950, to search the DCI according to the DCI search spaces.

According to some embodiments, the UE 120A, 120B, 120C is further configured, e.g. by means of a transmission module 960, to transmit data to or receive data from the base station according to the RAN slices, in order to meet different QoS requirements from the services.

In some embodiments, the UE 120A, 120B, 120C may comprise a processing module 901, such as a means for performing the methods described herein. The means may be embodied in the form of one or more hardware modules and/or one or more software modules.

In some embodiments, the processing module 901 may comprise one or more of the first receiving module 910, the second receiving module 920, the third receiving module 930, the fourth receiving module 940, the searching module 950, and the transmission module 960 as exemplifying hardware modules. In other examples, one or more of the aforementioned exemplifying hardware modules may be implemented as one or more software modules.

The UE 120A, 120B, 120C may further comprise a memory 902. The memory may comprise, such as contain or store, instructions, e.g. in the form of a computer program 903, which may comprise computer readable code units.

According to some embodiments herein, the UE 120A, 120B, 120C and/or the processing module 901 comprises a processing circuit 904 as an exemplifying hardware module, which may comprise one or more processors. Accordingly, the processing module 901 may be embodied in the form of, or 'realized by', the processing circuit 904. The instructions may be executable by the processing circuit 904, whereby the UE 120A, 120B, 120C is operative to perform the methods of FIG. 8. As another example, the instructions, when executed by the UE 120A, 120B, 120C and/or the processing circuit 904, may cause the UE 120A, 120B, 120C to perform the method according to FIG. 8.

Figure 9:
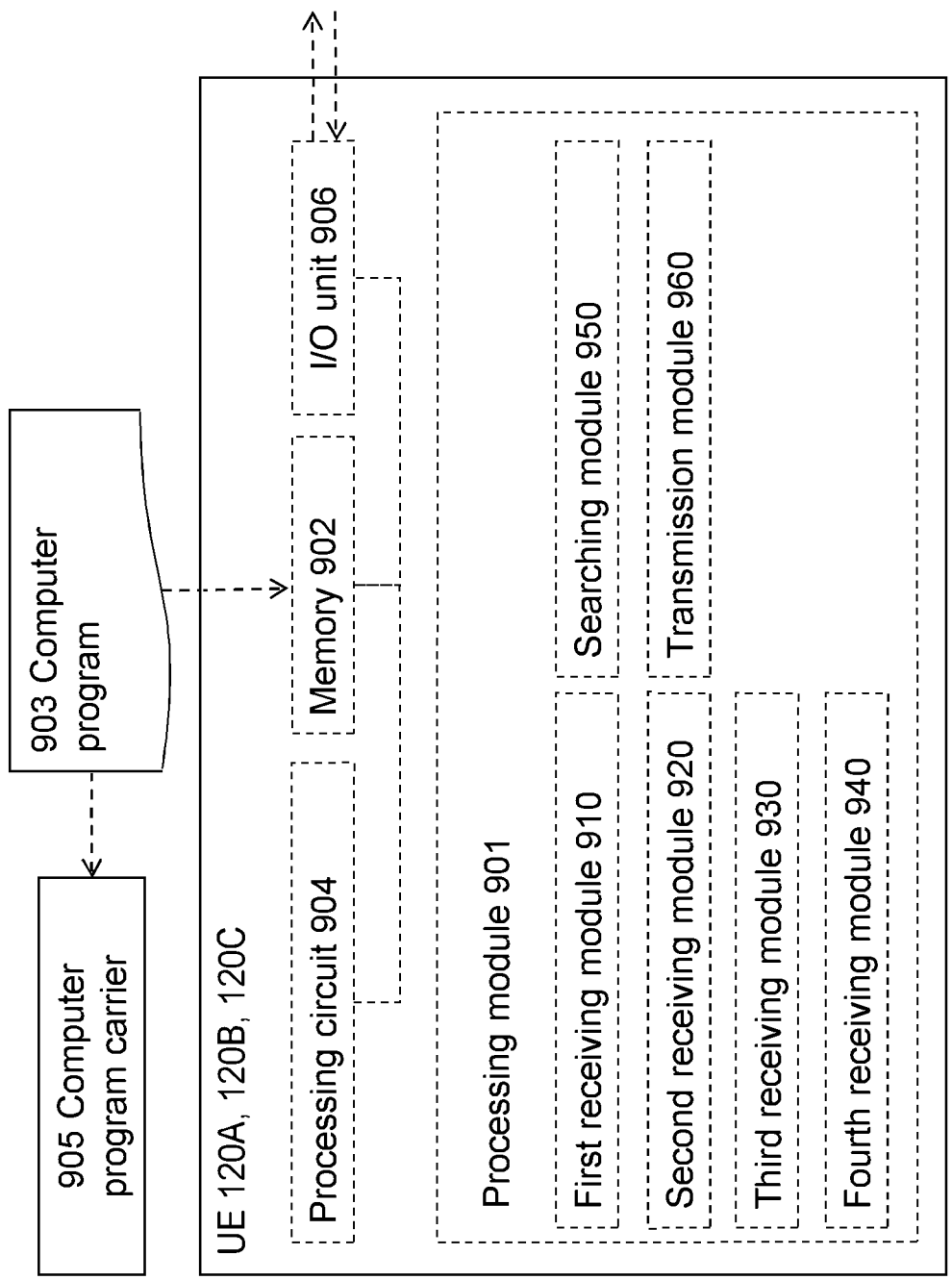
FIG. 9 is a block diagram illustrating embodiments of the user equipment.

FIG. 9 further illustrates a computer program carrier 905, or program carrier, which comprises the computer program 903 as described directly above.

Moreover, UE 120A, 120B, 120C may further comprise an Input/Output unit 906, which may be exemplified by the receiving module and/or the sending module as described below when applicable.

Network slicing consists of deploying multiple end-to-end logical networks in support of independent business operations. In contrast to deploying an independent network infrastructure, each instance of a slice (blueprint) should be possible to realize as a logical network corresponding to a shared infrastructure (including shared processing, storage, transport, radio spectrum, and hardware platforms), where it co-exists with other slices having potentially different characteristics.

In this way, the infrastructure and assets utilization will be much more cost and energy efficient while the logical separation allows for a flexible and independent configuration and management of the slices without compromising stability and security. Enabling slice realization over a common physical infrastructure would of course not prevent the realization of a slice instance by means of dedicated resources and assets.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a set of server machines of a cloud system.

As used herein, the term "module" may refer to one or more functional modules, each of which may be implemented as one or more hardware modules and/or one or more software modules and/or a combined software/hardware module in a node. In some examples, the module may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g. one or more processors, an Application Specific integrated Integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the term "radio resource" or "resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the expression "transmit" and "send" are considered to be interchangeable. These expressions include transmission by broadcasting, unicasting, group-casting and the like. In this context, a transmission by broadcasting may be received and decoded by any authorized device within range. In case of unicasting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

Even though embodiments of the various aspects have been described, many different alterations, modifications and the like thereof will become apparent for those skilled in the art. The described embodiments are therefore not intended to limit the scope of the present disclosure.

The invention claimed is:

1. A method performed by a base station in a Radio Access Network (RAN), the method comprising:
   mapping a first Transmission Time Interval (TTI) configuration associated with a carrier of the RAN to a first subband of the carrier, wherein the first subband is configured to support a first Quality of Service (QoS) requirement, wherein the first TTI configuration comprises a first number of Orthogonal Frequency-Division Multiplexing (OFDM) symbols, and wherein the first subband has a first resource pool for a first Downlink Control Information (DCI);
   mapping a second TTI configuration associated with the carrier to a second subband of the carrier, wherein the second subband is configured to support a second QoS requirement different from the first QoS requirement, wherein the second TTI configuration comprises a second number of the OFDM symbols, wherein the second TTI configuration is different from the first TTI configuration, and wherein the second subband has a second resource pool for a second DCI, in which the second DCI and the second resource pool are separate from the first DCI and the first resource pool;
   wherein the OFDM symbols with respect to the first and the second subbands are defined according to one numerology; and
   informing a user equipment (UE) of the first and second TTI configurations and search spaces for the first and second DCIs mapped respectively to the first and second subbands.

2. The method according to claim 1, wherein the first and the second TTI configurations correspond to at least one of: a type of the UE, the first and second QoS requirements, and a type of a service.

3. The method according to claim 1, wherein the informing is performed by using a Downlink Control Information (CDI) message.

4. The method according to claim 1, wherein the method further comprises:
   mapping a first number of subcarriers to the first subband; and
   mapping a second number of subcarriers to the second subband.

5. The method according to claim 1, wherein the first and the second TTI configurations comprise:
   a TTI length based on the number of OFDM symbols therein; or
   the TTI length and any one of: a Downlink Control Information (DCI) search space; a DCI format; a Uplink Control Information (UCI) search space; a UCI format; a channel state information (CSI) measurement; a CSI measurement report; a Status Report (SR); and a buffer status report.

6. A method performed by a user equipment (UE) for accessing a Radio Access Network (RAN), the method comprising:
   receiving a first and a second Transmission Time Interval (TTI) configurations, a search space for a first Downlink Control Information (DCI) and a search space for a second DCI, the first and second TTIs and the first and second DCIs mapped respectively to a first subband and a second subband of a carrier of the RAN;

wherein the first subband is configured to support a first Quality of Service (QoS) requirement, and the second subband is configured to support a second QoS requirement different from the first QoS requirement;

wherein the first TTI configuration comprises a first number of Orthogonal Frequency-Division Multiplexing (OFDM) symbols and wherein the first subband has a first resource pool for the first DCI;

wherein the second TTI configuration comprises a second number of OFDM symbols, wherein the second TTI configuration is different from the first TTI configuration, and wherein the second subband has a second resource pool for the second DCI, in which the second DCI and the second resource pool are separate from the first DCI and the first resource pool; and wherein the OFDM symbols with respect to the first and the second subbands are defined according to one numerology.

7. The method according to claim 6, wherein the first and the second TTI configurations correspond to at least one of: a type of the UE, the first and second QoS requirements, and a type of a service.

8. The method according to claim 6, wherein the receiving is performed by using a Downlink Control Information (DCI) message.

9. The method according to claim 6, wherein the method further comprises:
receiving an indication of the first subband, the first subband including a first number of subcarriers; and
receiving an indication of the second subband, the second subband including a second number of the subcarriers.

10. The method according to claim 6, wherein the first and the second TTI configurations comprise:
a TTI length based on the number of OFDM symbols therein; or
the TTI length and any one of: a Downlink Control Information (DCI) search space; a DCI format; a Uplink Control Information (UCI) search space; a UCI format; a channel state information (CSI) measurement; a CSI measurement report; a Status Report (SR); and a buffer status report.

11. A base station operable in a Radio Access Network (RAN), the base station comprising:
a processor;
a memory coupled to the processor, the memory containing instructions which, when executed by the processor, cause the base station to:
map a first Transmission Time Interval (TTI) configuration associated with a carrier of the RAN to a first subband of the carrier, wherein the first subband is configured to support a first Quality of Service (QoS) requirement, wherein the first TTI configuration comprises a first number of Orthogonal Frequency-Division Multiplexing (OFDM) symbols, and wherein the first subband has a first resource pool for a first Downlink Control Information (DCI);
map a second TTI configuration associated with the carrier to a second subband, wherein the second subband is configured to support a second QoS requirement different from the first QoS requirement, wherein the second TTI configuration comprises a second number of the OFDM symbols, wherein the second TTI configuration is different from the first TTI configuration, and wherein the second subband has a second resource pool for a second DCI, in which the second DCI and the second resource pool are separate from the first DCI and the first resource pool;

wherein the OFDM symbols with respect to the first and the second subbands are defined according to one numerology; and inform a user equipment (UE) of the first and second TTI configurations and search spaces for the first and second DCIs mapped respectively to the first and second subbands.

12. The base station according to claim 11, wherein the instructions further cause the base station to:
map a first number of subcarriers to the first subband; and
map a second number of subcarriers to the second subband.

13. A user equipment (UE) for accessing to a Radio Access Network (RAN), comprising:
a processor; and
a memory coupled to the processor, the memory containing instructions which, when executed by the processor, cause the UE to:
receive a first and a second Transmission Time Interval (TTI) configurations, a search space for a first Downlink Control Information (DCI) and a search space for a second DCI, the first and second TTIs and the first and second DCIs mapped respectively to a first subband and a second subband of a carrier of the RAN;
wherein the first subband is configured to support a first Quality of Service (QoS) requirement, and the second subband is configured to support a second QoS requirement different from the first QoS requirement;
wherein the first TTI configuration comprises a first number of Orthogonal Frequency-Division Multiplexing (OFDM) symbols and wherein the first subband has a first resource pool for the first DCI;
wherein the second TTI configuration comprises a second number of OFDM symbols, wherein the second TTI configuration is different from the first TTI configuration, and wherein the second subband has a second resource pool for the second DCI, in which the second DCI and the second resource pool are separate from the first DCI and the first resource pool; and
wherein the OFDM symbols with respect to the first and the second subbands are defined according to one numerology.

14. The UE according to claim 13, wherein the instructions further cause the UE to:
receive an indication of the first subband, the first subband including a first number of subcarriers; and
receive an indication of the second subband, the second subband including a second number of the subcarriers.

* * * * *